US012513083B2

(12) United States Patent
De Grace et al.

(10) Patent No.: US 12,513,083 B2
(45) Date of Patent: Dec. 30, 2025

(54) EXPANDING CONNECTION TABLES IN SMART SWITCHES IN SDN NETWORKS

(71) Applicant: MICROSOFT TECHNOLOGY LICENSING, LLC, Redmond, WA (US)

(72) Inventors: Gerald Roy De Grace, Atlanta, GA (US); James Allen Grantham, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 222 days.

(21) Appl. No.: 18/324,875

(22) Filed: May 26, 2023

(65) Prior Publication Data
US 2024/0163213 A1 May 16, 2024

Related U.S. Application Data

(60) Provisional application No. 63/425,668, filed on Nov. 15, 2022.

(51) Int. Cl.
*H04L 45/76* (2022.01)
*H04L 47/193* (2022.01)

(52) U.S. Cl.
CPC ............ *H04L 45/76* (2022.05); *H04L 47/193* (2013.01)

(58) Field of Classification Search
CPC ................................. H04L 45/76; H04L 47/193
See application file for complete search history.

(56) References Cited

U.S. PATENT DOCUMENTS

2014/0040459 A1 2/2014 Ankita
2015/0326912 A1 11/2015 Casagrande

FOREIGN PATENT DOCUMENTS

CN 111585903 A * 8/2020 ............ H04L 47/10

OTHER PUBLICATIONS

Yan Huang, "A Flow Table with Two-Stage Timeout Mechanism for SDN Switches", 2019 (Year: 2019).*
D. W. Kim, W. O. Kwon, K. Park and S. W. Kim, "Internet Protocol Engine in TCP/IP Offloading Engine," 2008 10th International Conference on Advanced Communication Technology, Gangwon, Korea (South), 2008, pp. 270-275, doi: 10.1109/ICACT.2008.4493759. (Year: 2008).*

(Continued)

*Primary Examiner* — Messeret F Gebre
(74) *Attorney, Agent, or Firm* — Han Gim; Newport IP, LLC

(57) ABSTRACT

Techniques are disclosed for managing states at a networking device configured to track connections or bidirectional flows of a communication session in a software defined network (SDN). The networking device has an active processing engine and a passive processing engine. The connection record for an idle connection is maintained in the connection table stored at the passive processing engine, thereby allowing the passive processing engine to maintain connection state information for the idle connection and avoid storing connection state information for the idle connection at the active processing engine.

20 Claims, 8 Drawing Sheets

(56) References Cited

OTHER PUBLICATIONS

S. Y. Jiang, Z. Lu, Y. Y. Mao, G. Luo and Q. Li, "The design and implementation of TCP hardwiring and offloading engine," 2015 IEEE International Conference on Applied Superconductivity and Electromagnetic Devices (ASEMD), Shanghai, China, 2015, pp. 52-53, doi: 10.1109/ASEMD.2015.7453462. (Year: 2015).*
International Search Report and Written Opinion received for PCT Application No. PCT/US2023/033809, Nov. 28, 2023, 16 pages.

* cited by examiner

EXPANDING CONNECTION TABLES IN SMART SWITCHES IN SDN NETWORKS

PRIORITY APPLICATION

This application claims the benefit of and priority to U.S. Provisional Application No. 63/425,668, filed Nov. 15, 2022, the entire contents of which are incorporated herein by reference.

BACKGROUND

A data center houses computer systems and various networking, storage, and other related components. Data centers are, for example, used by service providers to provide computing services to businesses and individuals as a remote computing service or provide "software as a service" (e.g., cloud computing). Software defined networking (SDN) enables centralized configuration and management of physical and virtual network devices as well as dynamic and scalable implementation of network policies. The efficient processing of data traffic is important for maintaining scalability and efficient operation in such networks.

It is with respect to these considerations and others that the disclosure made herein is presented.

SUMMARY

Disclosed herein are systems and methods for optimizing data processing units (DPUs) in smart switches, SDN appliances, or other network devices that manage connection tables that hold state information for established connections. In general, connections in an SDN network are processed in a DPU or DPU complex that may comprise one or more smart switches, SDN appliances, or other network devices. In an example, the connection state can be for a TCP connection. The DPU complex is configured to perform policy enforcement, packet transformations, and packet forwarding for connections in a communications network. The present disclosure discloses a way to extend a connection table to another processor and memory subsystem, such as in a backup system. An overflow connection table is used to hold underutilized connections for a period of time without deleting the information and without burdening the fast path connections that are active and exchanging data. Use of an overflow connection table allows for the connection table space for active connections to be increased, thus enabling the DPU complex to maintain a greater number of connections.

The present disclosure provides techniques to allow for efficiency improvements in establishing and maintaining connection states across devices. The described techniques can allow for virtual computing environments to support a variety of configurations while maintaining efficient use of computing resources such as processor cycles, memory, network bandwidth, and power. This Summary is provided to introduce a selection of concepts in a simplified form that are further described below in the Detailed Description. This Summary is not intended to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
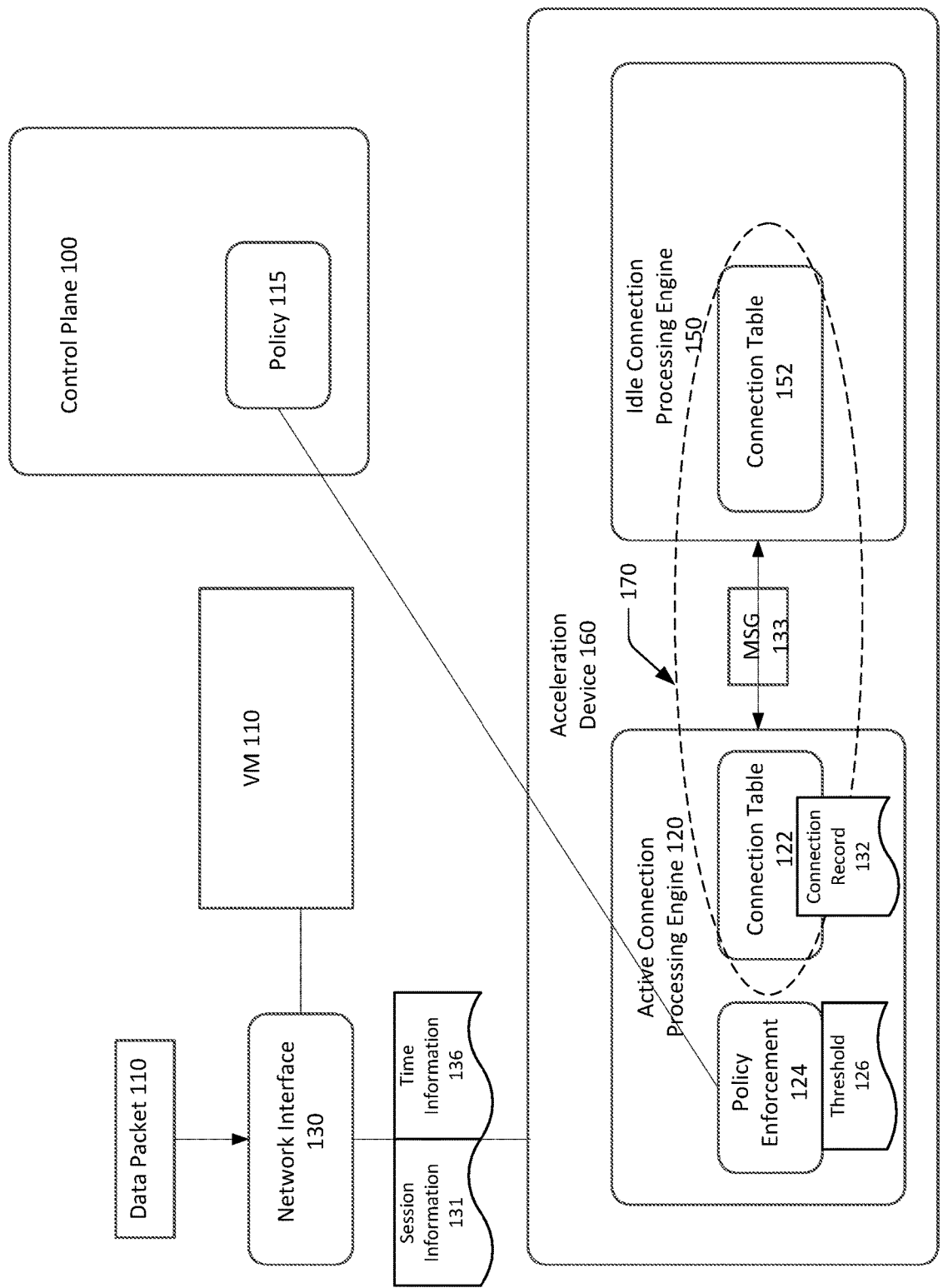
FIG. 1 is a diagram illustrating an example architecture in accordance with the present disclosure.

The disclosed embodiments enable datacenters to provide services in a manner that can reduce the cost and complexity of their networks, allowing for more efficient use of computing, storage, and network resources. Efficient implementation of the end-to-end service by a cloud service provider can enable an experience that is seamless and more consistent across various footprints. The integration of multi-tenant and single-tenant resources with a comprehensive resource management approach can also minimize the overhead for the user, who will not need to address policy enforcement issues and perform other complex management tasks. The efficient implementation of the described synchronization functions can provide improvements for various performance and security metrics such as latency and data security.

The present disclosure describes embodiments for optimizing data processing units (DPUs) in smart switches, SDN appliances, or other devices to efficiently manage connection tables. A DPU, in one example, is a component that is configured for packet processing and can be implemented as hardware, software, or a combination. In one embodiment, the DPU is implemented as an ASIC. As discussed further herein, DPU processing can include fast path and slow path processing within a programmable data path. The slow path evaluates every connection against a set of rules that can be complex in nature. The rules dictate whether a packet is allowed to continue its destination either directly or through an intermediate device. For example, the rules can cover allow/deny/mirror, actions as well as the transformation that the packet must undergo including any modification to the packet or tunnel layers. The rules can be applied in both directions for any packet that leaves or attempts to enter a virtual machine (VM). Cloud environments typically support this type of functionality to ensure that virtual machines remain within their virtual network and are not allowed to access any other virtual networks or networking functions.

The processing associated with such rule application can be very complex and consist of many thousands of rules and related tables. After the processing is complete for the first packet of a connection (this processing referred to as the "slow path"), the connection can subsequently be matched according to the connection's 5 tuple without performing the full rule processing. For this reason, the connection can be placed into a "fast path" where the exact matched connection and transformation can be consulted using much simpler table lookup algorithms. This results in much higher ongoing performance for established connections. Although fast path processing is much simpler than slow path processing, fast path processing can lead to the expense of creating what can be a very large table to hold the established connections. This table can get large enough to consume many gigabytes of memory and in fact can limit the number of connections that a VM can source or sink. Additionally, TCP does not mandate keep-alive packets to probe for connection liveliness. Even when keep-alive packets are implemented, the default is typically two hours which is considered a long period of time in terms of connection handling. Thus the total number of connections can grow significantly.

While many of the present examples are illustrated using TCP, it should be understood that the disclosed techniques for expanding connection tables can be implemented for UDP connections/flows and other types of connections or flows.

In an example of implementing Internet of Things (IoT) over 5G, the number of devices can create an extremely high demand for the creation of connections to cloud services. This demand can translate to hundreds of thousands of connections/second but more importantly these devices will create connections and keep the connections alive even when not active. This in turn leads to high numbers of connections in the fast path table (also referred to as a connection table) even when the connections are not active. For example, as homes add more IoT devices to control various home features such as lights, heating, air, security, etc., the number of end points will grow rapidly. Only a small number of these IoT devices require a high level of communications. At the same time, in many cases the exchange of data need to be immediate and reliable. Having the ability to keep many IoT devices in an idle state but maintaining connection for longer periods of time will enable more applications that require infrequent but fast responses. The extension of the idle connection table allows for the number of connections that need to be ready for data exchange to be scaled indefinitely and without having to re-establish connections which may not allow for all events to be detected or responded to. To cover these and other scenarios, the present disclosure provides a way to maintain large numbers of idle connections in an idle connection table where the idle connections will not burden the fast path connections that are active and exchanging data.

The present disclosure provides a way to extend the connection table and fast path processing to another processor and memory subsystem. In an embodiment, slow path processing is not moved out of the DPU complex. In this embodiment, the slow path processing is moved to an additional processor and memory subsystem on the same device, and can be in the same DPU complex. As used herein, a DPU complex can include one or more devices that are configured to process packets in the manner described herein, which can include an appliance or switch and optionally a server or other computing device.

The disclosed embodiments are advantageous in situations where connections have low utilization such that it is not necessary for an increase in the processor capabilities in order to match the growing number of connections. In an embodiment, device attributes may be focused on having sufficient memory to expand the fast path connection table. Many use cases involve online transactions for entities that maintain a high percentage of connections that remain open with very little data occupying the connection for long periods of time. The disclosed embodiments leverage this observation to enable the creation of larger connection tables than would be possible by keeping the fast path processing table completely within the device processing complex.

In an embodiment, an underutilized connection can be defined as one that meets a threshold, such as a connection that has not received N packets (where N is a small number) for x-period of time. This can apply to both TCP and UDP flows. These underutilized connections can be considered for expulsion from the fast path connection table to be processed by another engine or function dedicated to underutilized connection processing.

One problem that can occur with underutilized connections is that the underutilized connections end up in the fast path table and yet do not require processing for long periods of time. This idle occupancy can consume the fast path connection table and, in the worst case, deny new connections from entering the table. In the best case, this idle occupancy can cause extra processing to remove the oldest connections. This can cause negative side effects on the TCP end points as they would have to undergo a lengthy TCP time-out and restart sequence, which in turn can lead to application failures and a negative end user experience.

In various embodiments, an overflow connection table is used to hold underutilized connections for a longer period of time while enabling increased connection table space for active connections. In an example, if only 25% of connections are active, then if the connection table is designed for 2 million entries, it could be possible to support a total of 8 million entries (2 million active and 6 million idle) if an overflow connection table is implemented to maintain the idle connections.

In some embodiments, fast path connection table eviction to the overflow table is allowed when the fast path connection table approaches a threshold as described above. This can avoid performance variations between packets processed out of the fast path and packets processed out of the idle connection overflow table.

In an embodiment, an exception can be made for connections that have already been placed in the fast path. These packets can be processed in the following manner through an external dedicated processor that provides packet processing for underutilized connections. In addition to offloading the fast path table of underutilized connections, another advantage of an additional processor is that the additional processor can be equipped with a large amount of memory to service a very large table of idle connections. The additional processor and associated memory can be part of the same device, in one embodiment. The additional processor and associated memory can be referred to herein as an external idle processing engine, an idle connection processing engine, or an idle processing engine.

In one embodiment, a sequence for processing idle flows is as follows:

A connection is found inactive for a predetermined period of time but less than the connection aging time-out and is identified as a candidate to be moved to the external idle processing engine to free up fast path connection table space. Some devices today have powerful main processors with ample memory to handle both idle processing and large tables. The predetermined period of time may be preprogrammed or can be adjusted as an input parameter.

Once evicted to the idle processing engine, packets that arrive at the device (e.g., a DPU) that are not found in the fast path AND not FIN/FIN-ACK are forwarded to the idle processor for idle processing to handle the expected SDN operations for the connection (transforms, forwarding, etc.).

Once a connection has been offloaded to the idle path, a connection may encounter closing TCP flag packets which would be expected to arrive at the DPU. These FIN/FIN-ACK/ACK frames are forwarded to the idle processing engine which will remove the connection in the same way that the fast path would have performed this action.

As packets arrive at the DPU using the same SYN/SYN-ACK, these packets will undergo normal slow path processing and can leave a straggling entry in the idle processing engine. For this reason, garbage collection can be performed to ensure that the same connection cannot exist both in the fast path and the idle processing engine.

Under normal circumstances, the idle processing engine will return the packet with the correct transformations and forwarding information so that the DPU can forward the packet via the correct interface.

In an embodiment, the idle processing engine also maintains the same counters for the flow for operations, monitoring, metering, and billing. This processing sequence can be performed for several packets or until the idle processing engine declares the connection to be lively. At this time the idle processing engine can send a request for the connection to be placed back into the fast path connection table.

The idle processing engine is not required to perform slow path operations, which allows for less complex implementation. The idle processing engine is configured to act as a passive or supporting device to the DPUs and maintain a fast path connection table for idle connections. If any packet arrives that cannot be located within the idle connection table, such a packet can match a DoS attack where SYN is never sent but packets from a non-established connection follow, hence such packets can be dropped. The same process can be performed for UDP packets, where if there is no corresponding idle connection, then it can be assumed that the connection was never installed and that no slow path was performed, and such packets can be dropped.

The communications for establishing each idle connection entry can include any simple communications channel exchanging the necessary data between the DPUs and the idle processing engine. The information generally includes the exact IP tuple (or connection ID) along with some transformation instructions, and instructions for metering, etc. It is also assumed that the DPUs are the active/controlling processor for the extended table in that the DPUs request the creation of idle entries and request the deletion/cleanup of idle entries. In an embodiment, connection tables may be formed and referenced through a 5-tuple key per virtual interface. The content of the connection table points to a mapping table that can be used to translate, encapsulate, and forward packets. Each connection in the connection table has a reference to a specific mapping table entry as all connections in the connection table are unique. In an embodiment, the fast path record can be located using the TCP tuple key consisting of (SRC IP, DST IP, SRC Port, DST Port, Port ID). The connection record includes the TCP tuple key, the currently derived TCP state, as well as forwarding and transformation information used by fast path processing and other possible meta-data. The connection record can also include the bi-directional UDP flow tuple key and the currently derived UDP state. As used herein, the slow path refers to a full packet processing path, and the fast path refers to a connection being offloaded to processing on an acceleration device once a connection is evaluated (e.g., via the slow path).

Implementation of the idle processing engine allows for the creation of much larger connection tables in many practical cases while only implementing fast path operations. In some embodiments, the set of DPUs and the idle processing engine can be co-located on the same appliance, smart switch, or other device. The actual or effective processing rate can be extremely high as the idle processing engine can use high speed PCIE connectivity to the DPUs for control and packet exchange. However, the actual packet rate can be low as only connections with low occupancy are selected to move to the idle processing engine.

As used herein, a device that is configured to track connections in a software defined network (SDN) may include network devices, appliances, and other devices that are implemented for processing packets in SDNs and other architectures that require processing of packets that are associated with various sessions and connections. Such devices may also be referred to as an accelerator device. For example, with reference to FIG. 1, illustrated is an example architecture illustrating packet processing according to the disclosed embodiments. In one example, a packet 110 in a flow may be received via a network interface 130. Packet 110 may be identified and sent to an accelerator device 160 that is configured to perform processing of data flows in the fast path, as discussed herein. Slow path connections may be performed by active connection processing engine 120 and inserted into a connection table 122. The active connection processing engine 120 may apply applicable policies 115 for the data flow associated with the data packet 110 and terminate application of the policies when the data flow is complete. Policy enforcement 124 may be applied for SDN policies 115 that are received, for example, from the SDN control plane 100.

An idle connection processing engine 150 may be communicatively coupled to active connection processing engine 120 and receive idle connections in accordance with the techniques described herein. Idle connections may be received and stored in idle connection table 152. In an embodiment, the connection table 122 and idle connection table 152 may logically form a collective logical connection table 170 that contains all connection state information for the acceleration device 160. That is, from a point of view external to the acceleration device 160, the collective logical connection table 170 allows the acceleration device 160 to appear to have a connection table containing all active connections stored in connection table 122 and all idle connections stored in idle connection table 152, which is a much greater total number of connections than were previously possible with only the connection table 122 of active connection processing engine 120.

In an example, FIG. 1 illustrates a method for managing states at a networking device such as accelerator device 160 that is configured to track connections or bidirectional flows of a communication session in a software defined network (SDN). The accelerator device 120 has an active connection processing engine 120 and a passive connection processing engine 150. The active connection processing engine 120 processes packet 110 which is associated with a communication session. Session information 131 for the communication session is stored at the active connection processing engine 120 in a connection record 132. In response to determining, by the active connection processing engine 120, that a time period indicated in time information 136 between packets received for the communication session exceeds a threshold 126, it is determined that the communication session is an idle connection. The active connection processing engine 120 sends, to the passive connection processing engine 150, a message 133 that contains connection tuple information and connection state for the idle connection, wherein the connection tuple information is usable by the passive connection processing engine 150 to transfer the connection record 132 to a connection table 152 stored at the passive connection processing engine 150. The connection record 132 for the idle connection is maintained in the connection table 152 stored at the passive connection processing engine 150, thereby allowing the passive connection processing engine 150 to maintain connection state information for the idle connection and avoid storing connection state information for the idle connection at the active connection processing engine 120. A combined connection table 170 for the SDN is a sum of connection tables 122, 152 stored by the active connection processing engine 120 and passive connection processing engine 150 which collectively allows for an increased number of total connection records that can be serviced by the acceleration device 160.

Figure 2:
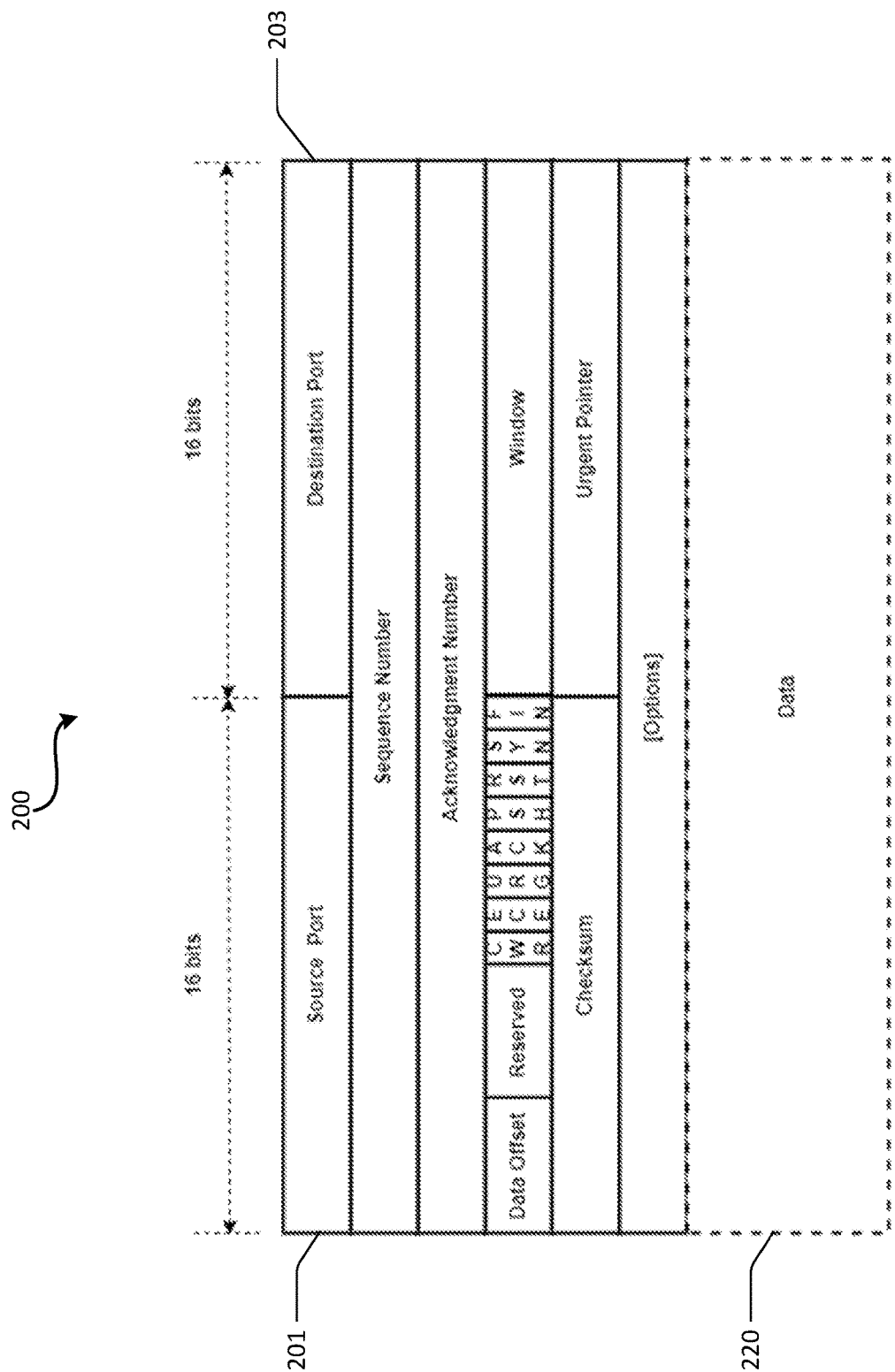
FIG. 2 is a diagram illustrating an example header in accordance with the present disclosure.
Figure 3:
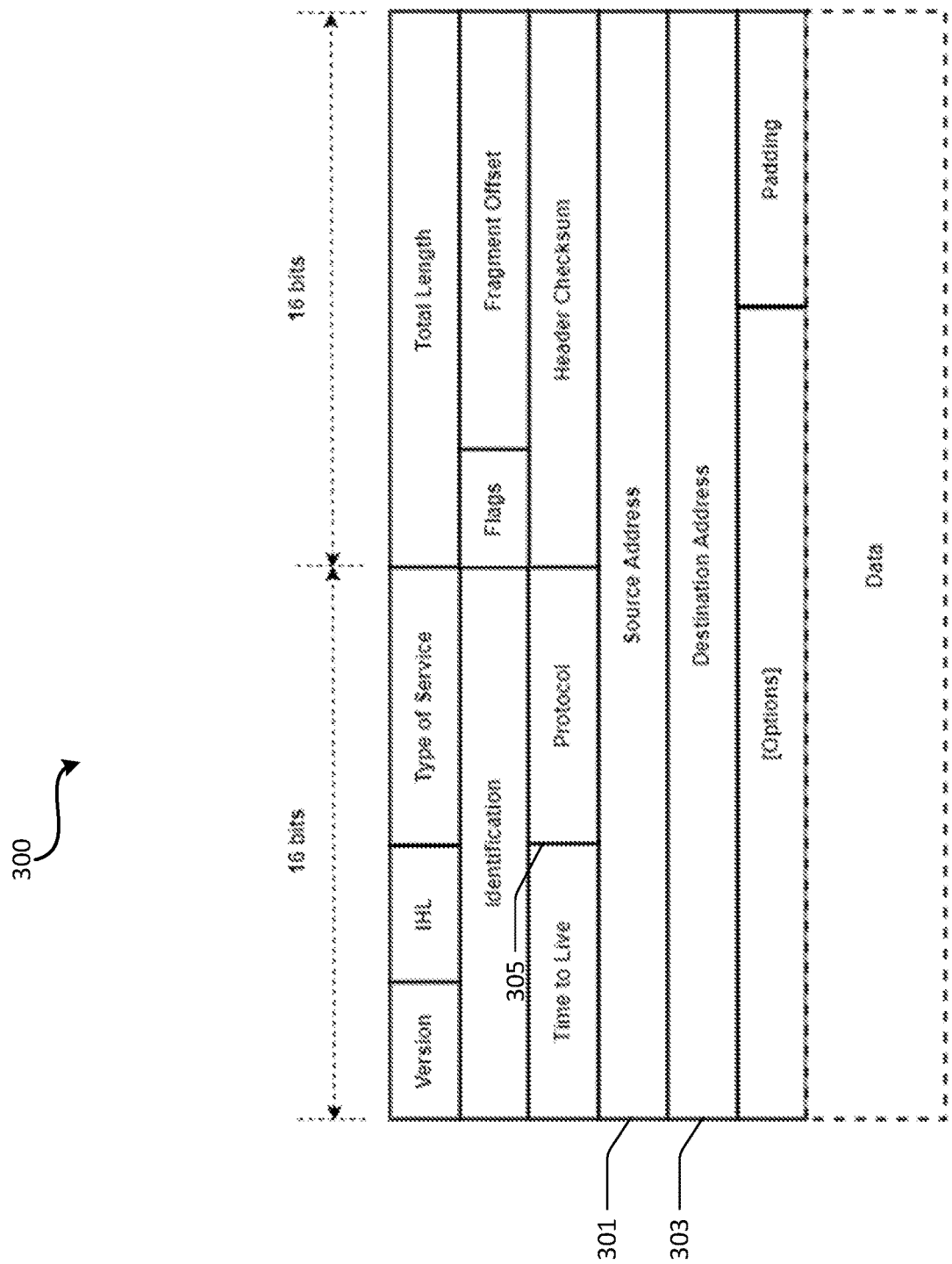
FIG. 3 is a diagram illustrating an example header in accordance with the present disclosure.

With reference to FIG. 2, illustrated is an example a TCP Header Definition 200. The TCP Header Definition 200 includes a source port field 201, destination port field 203, and data or payload 220. With reference to FIG. 3, illustrated is an example IP Header Definition 300. In an embodiment, a reference may be made to a 5-tuple match which includes the IP frame source 301, destination 303, and protocol type 305. The TCP header 200 adds the source port 203 and destination port 205. These five fields make up a unique key that uniquely identifies one connection from another. Fast path operations of connection processing engines are based on building a connection table with 5-tuple as the key, that in turn points to a group of related mappings that describe how to transform a packet and/or add tunnels, identify the outgoing interface(s) and so forth. The connection table itself is created on a per virtual interface basis. This could be an interface of a VM, for example. Connection processing engines typically perform the connection processing for many virtual interfaces. Connection tracking equates to bandwidth that cannot be used for user traffic and hence any reduction or compression of messages for synchronizing connection states will increase the available throughput for user traffic.

In an example, it is assumed that the simplest way to convey connection state to another device or machine would be for the primary device or machine to communicate related packets for the TCP connection state to the secondary device or machine. This would include any packet with TCP flags set such as (SYN, SYN-ACK, ACK, FIN, FIN-ACK, ACK, RESET). These particular packet types (indicated by TCP flags) allow an identical and standardized TCP state machine to derive the connection state. Corresponding information may be used for connection state or flow state for User Datagram Protocol (UDP) flows or connections.

Methods for creating a "fast path connection record" when a SYN packet arrives can be similar to what is commonly referred to as "slow path" as described in Disaggregated APIs for SONiC Hosts (DASH) open-source documentation found within Github. Connection flows can be re-simulated using the techniques described in application Ser. No. 17/855,730 "RE-SIMULATION OF UPDATED SDN CONNECTION FLOWS" filed Jun. 30, 2022, the contents of which are incorporated herein by reference.

Figure 4:
FIG. 4 is a diagram illustrating an example connection record in accordance with the present disclosure.

FIG. 4 illustrates an example record of a fast path connection table 400. Connection table 400 illustrates an entry for a connection key 410 that includes a Destination IP, Source IP, Destination Port, Source Port, and Protocol ID. Forwarding Instruction 420 may include, for example, an Output Interface that may indicate where the packet needs to go, such as identify an interface at a network interface card (NIC). Transformation Instructions 430 may include a Transformation Pointer into the Transformation Table. The instructions may indicate the transformations identified for packets in the flow such as applying a tunnel on it, changes of source or destination addresses, new filters, etc. Metering 440 may include a series of metering contents for the connection/flow. Metering may allow for charging based on usage, for example.

The Connection Key 410 may be a constant for the duration of the record. The Forwarding Instruction 420 output interface can be updated by the SDN control plane via re-simulation. Transformation Instructions 430 can be updated by the SDN control plane via-re-simulation. Metering 440 may be valid while the record is constant or aggregated and sent upwards if the record is changed. Connection state information 450 includes various information needed for each connection or flow.

Figure 5:
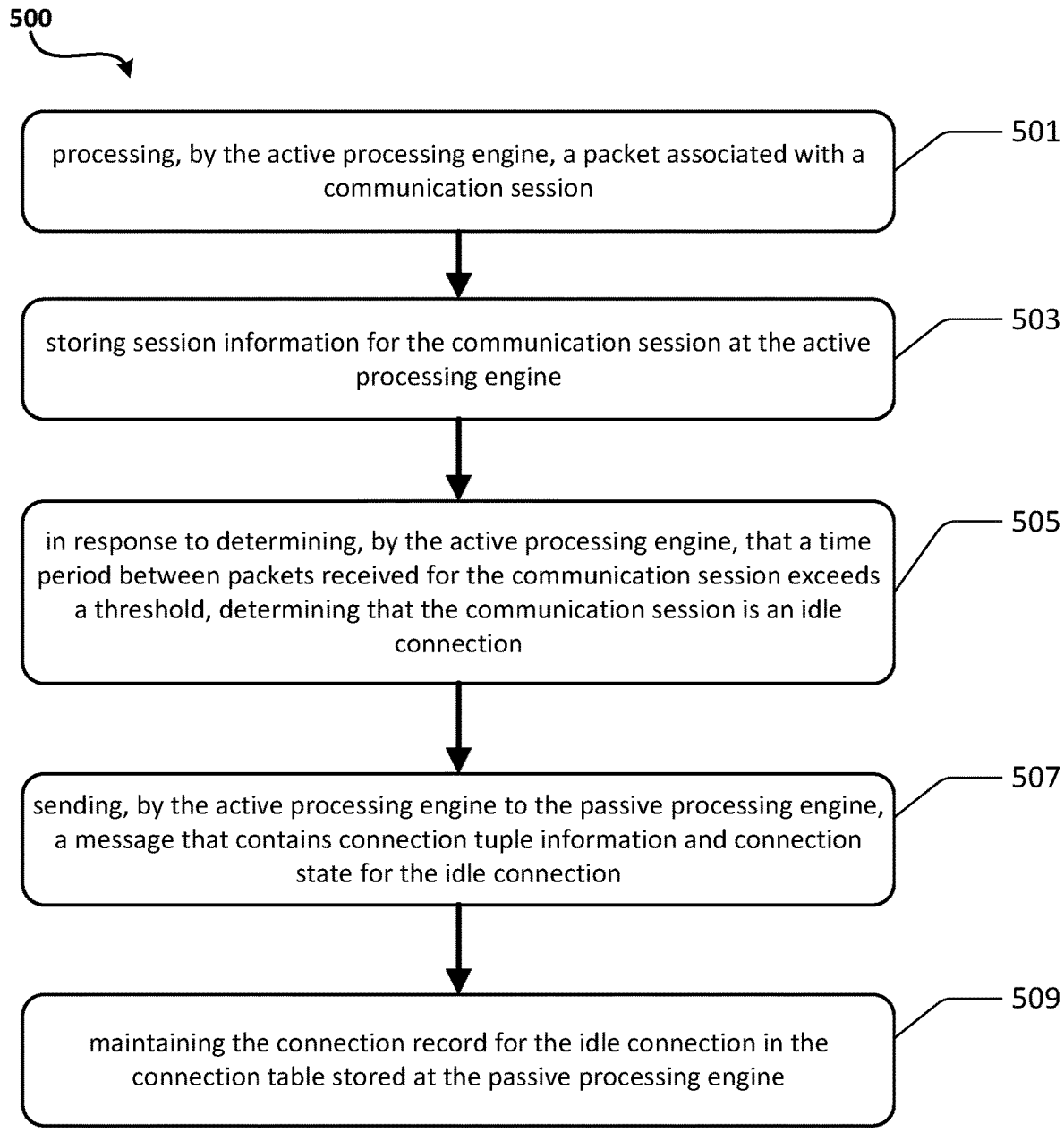
FIG. 5 is a flowchart depicting an example procedure in accordance with the present disclosure.

Turning now to FIG. 5, illustrated is an example operational procedure for managing states at a networking device configured to track connections or bidirectional flows of a communication session in a software defined network (SDN). In an embodiment, the networking device includes an active processing engine and a passive processing engine.

Such an operational procedure can be provided by one or more components illustrated in FIGS. 1 through 4. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 500 is described as running on a system, it can be appreciated that the routine 500 and other operations described herein can be executed on an individual computing device or several devices.

Referring to FIG. 5, operation 501 illustrates processing, by the active processing engine, a packet associated with a communication session.

Operation 503 illustrates storing session information for the communication session at the active processing engine in a connection record.

Operation 505 illustrates in response to determining, by the active processing engine, that a time period between packets received for the communication session exceeds a threshold, determining that the communication session is an idle connection.

Operation 507 illustrates sending, by the active processing engine to the passive processing engine, a message that contains connection tuple information and connection state for the idle connection. In an embodiment, the connection tuple information is usable by the passive processing engine to transfer the connection record to a connection table stored at the passive processing engine.

Operation 509 illustrates maintaining the connection record for the idle connection in the connection table stored at the passive processing engine. This allows the passive processing engine to maintain connection state information for the idle connection and avoid storing connection state information for the idle connection at the active processing engine. A combined connection table for the SDN is a sum of connection tables stored by the active and passive processing engines which collectively allows for an increased number of total connection records that can be serviced by the networking device.

Figure 6:
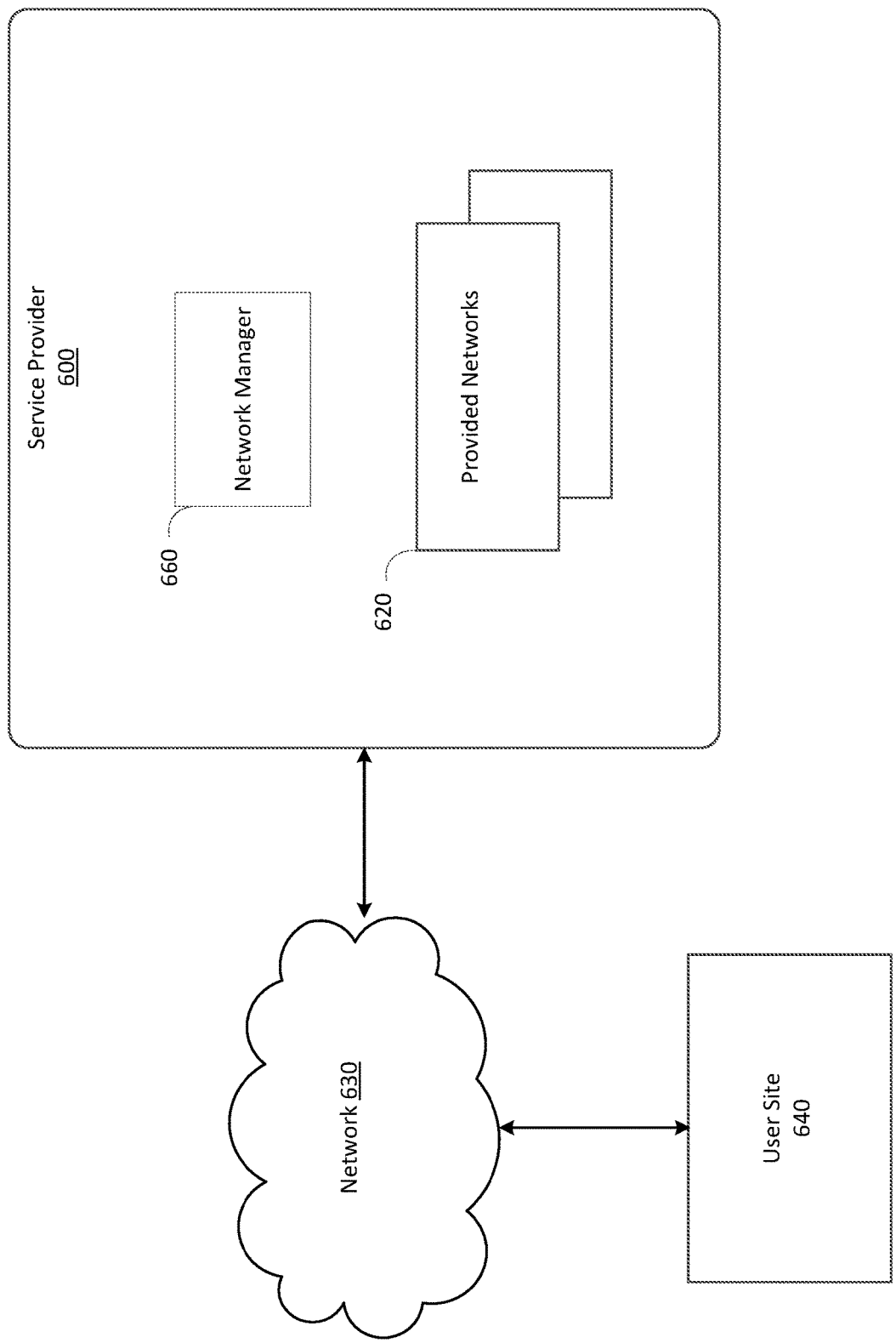
FIG. 6 is an example computing system in accordance with the present disclosure.

FIG. 6 illustrates an example computing environment in which the embodiments described herein may be implemented. FIG. 6 illustrates a service provider 600 that is configured to provide computing resources and provided networks 620 to users at user site 640. The user site 640 may have user computers that may access services provided by service provider 600 via a network 630. The computing resources provided by the service provider 600 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 600 may have various computing resources including servers, routers, and other devices that may provide remotely accessible computing and network resources using, for example, virtual machines. Other resources that may be provided include data storage resources. Service provider 600 may also execute functions that manage and control allocation of network resources, such as a network manager 660.

Network 630 may, for example, be a publicly accessible network of linked networks and may be operated by various entities, such as the Internet. In other embodiments, network 630 may be a private network, such as a dedicated network that is wholly or partially inaccessible to the public. Network 630 may provide access to computers and other devices at the user site 640.

Figure 7:
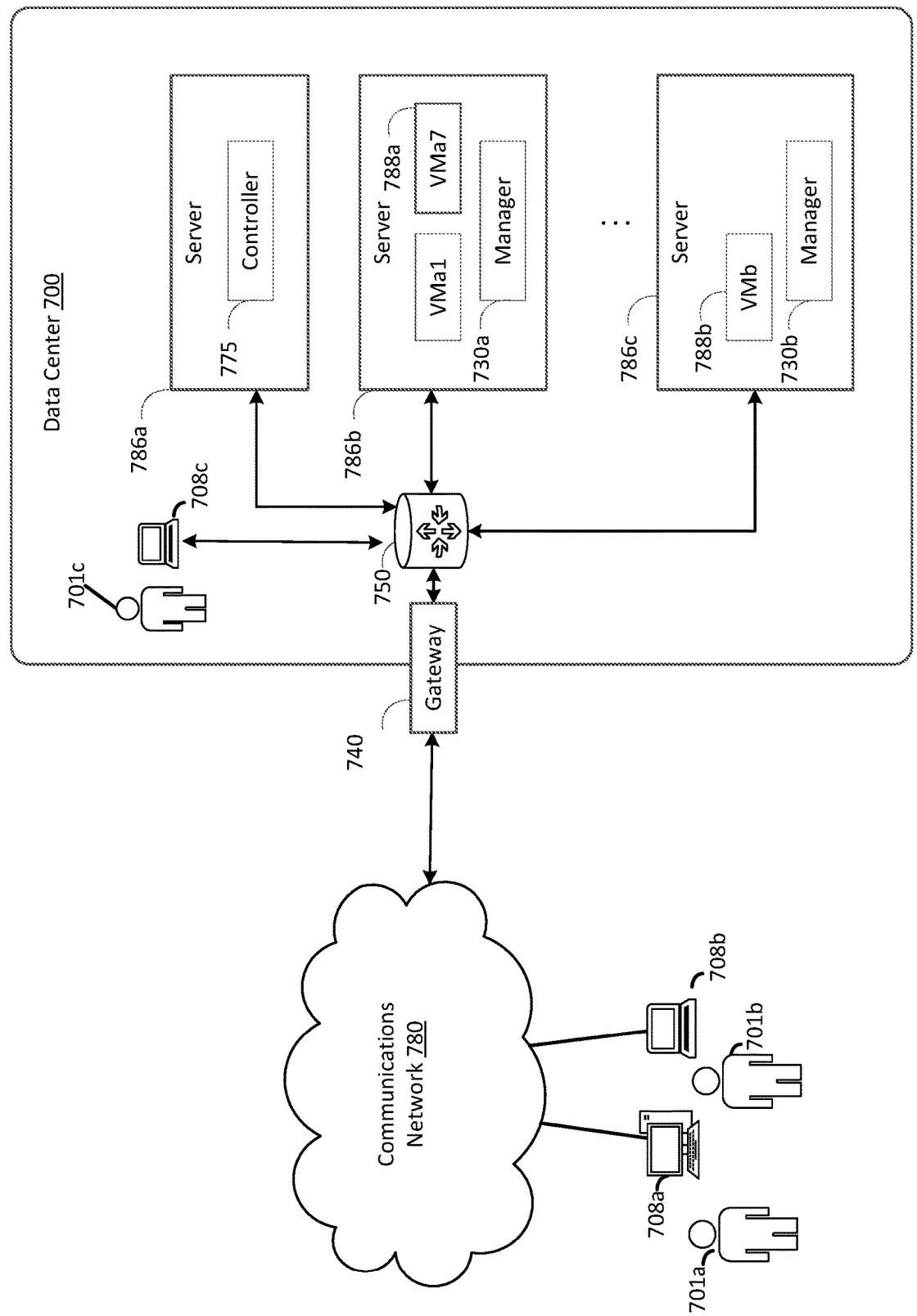
FIG. 7 is a diagram illustrating a data center in accordance with the present disclosure.

FIG. 7 illustrates an example computing environment in which the embodiments described herein may be implemented. FIG. 7 illustrates a data center 700 that is configured to provide computing resources to users 701a, 701b, or 701c (which may be referred herein singularly as "a user 701" or in the plural as "the users 701") via user computers 708a, 708b, and 708c (which may be referred herein singularly as "a computer 708" or in the plural as "the computers 708") via a communications network 780. The computing resources provided by the data center 700 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 700 may correspond to service provider 600 in FIG. 6. Data center 700 may include servers 786a, 786b, and 786c (which may be referred to herein singularly as "a server 786" or in the plural as "the servers 786") that may be standalone or installed in server racks, and provide computing resources available as virtual machines 788a and 788b (which may be referred to herein singularly as "a virtual machine 788" or in the plural as "the virtual machines 788"). The virtual machines 788 may be configured to execute applications such as Web servers, application servers, media servers, database servers, and the like. Other resources that may be provided include data storage resources (not shown on FIG. 7) and may include file storage devices, block storage devices, and the like. Servers 786 may also execute functions that manage and control allocation of resources in the data center, such as a controller 775. Controller 775 may be a fabric controller or another type of program configured to manage the allocation of virtual machines on servers 786.

Referring to FIG. 7, communications network 780 may, for example, be a publicly accessible network of linked networks and may be operated by various entities, such as the Internet. In other embodiments, communications network 780 may be a private network, such as a corporate network that is wholly or partially inaccessible to the public.

Communications network 780 may provide access to computers 708. Computers 708 may be computers utilized by users 701. Computer 708a, 708b or 708c may be a server, a desktop or laptop personal computer, a tablet computer, a smartphone, a set-top box, or any other computing device capable of accessing data center 700. User computer 708a or 708b may connect directly to the Internet (e.g., via a cable modem). User computer 708c may be internal to the data center 700 and may connect directly to the resources in the data center 700 via internal networks. Although only three user computers 708a, 708b, and 708c are depicted, it should be appreciated that there may be multiple user computers.

Computers 708 may also be utilized to configure aspects of the computing resources provided by data center 700. For example, data center 700 may provide a Web interface through which aspects of its operation may be configured through the use of a Web browser application program executing on user computer 708. Alternatively, a stand-alone application program executing on user computer 708 may be used to access an application programming interface (API) exposed by data center 700 for performing the configuration operations.

Servers 786 may be configured to provide the computing resources described above. One or more of the servers 786 may be configured to execute a manager 730a or 730b (which may be referred herein singularly as "a manager 730" or in the plural as "the managers 730") configured to execute the virtual machines. The managers 730 may be a virtual machine monitor (VMM), fabric controller, or another type of program configured to enable the execution of virtual machines 788 on servers 786, for example.

It should be appreciated that although the embodiments disclosed above are discussed in the context of virtual machines, other types of implementations can be utilized with the concepts and technologies disclosed herein.

In the example data center 700 shown in FIG. 7, a network device 750 may be utilized to interconnect the servers 786a and 786b. Network device 750 may comprise one or more switches, routers, or other network devices. Network device 750 may also be connected to gateway 740, which is connected to communications network 780. Network device 750 may facilitate communications within networks in data center 700, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 700 described in FIG. 7 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In some embodiments, aspects of the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a case in which at least some tasks are implemented in hard ASIC logic or the like, or a case in which at least some tasks are implemented in soft (configurable) logic or the like, a case in which at least some tasks run as software on software processor overlays or the like; a case in which at least some tasks run as software on hard ASIC processors or the like, etc., or any combination thereof. A component may represent a homogeneous collection of hardware acceleration devices. On the other hand, a component may represent a heterogeneous collection of different types of hardware acceleration devices including different types of devices having different respective processing capabilities and architectures, a mixture of devices and other types hardware acceleration devices, etc.

Figure 8:
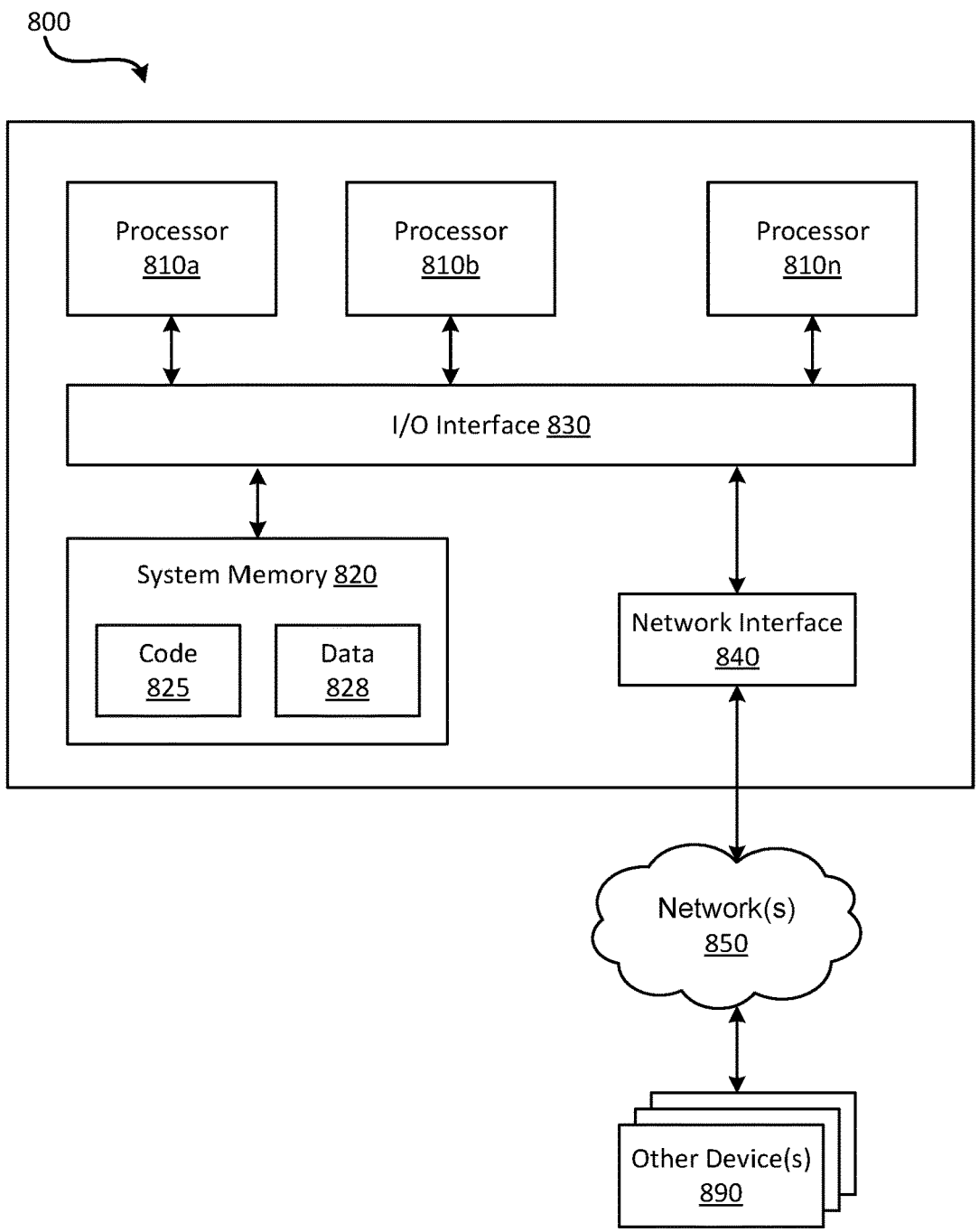
FIG. 8 is a diagram illustrating an example system in accordance with the present disclosure.

FIG. 8 illustrates a general-purpose computing device 800. In the illustrated embodiment, computing device 800 includes one or more processors 810a, 810b, and/or 810n (which may be referred herein singularly as "a processor 810" or in the plural as "the processors 810") coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x88, PowerPC, SPARC, or MIPS ISAs, or any other suitable ISA. In multiprocessor systems, each of processors 810 may commonly, but not necessarily, implement the same ISA.

System memory 88 may be configured to store instructions and data accessible by processor(s) 810. In various embodiments, system memory 88 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 820 as code 825 and data 828.

In one embodiment, I/O interface 830 may be configured to coordinate I/O traffic between the processor 810, system memory 88, and any peripheral devices in the device, including network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of I/O interface 830, such as an interface to system memory 820, may be incorporated directly into processor 810.

Network interface 840 may be configured to allow data to be exchanged between computing device 800 and other device or devices 890 attached to a network or network(s) 850, such as other computer systems or devices as illustrated in FIGS. 1 through 5, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for the Figures for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

Although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for managing states at a networking device configured to track connections or bidirectional flows of a communication session in a software defined network (SDN), the networking device having an active processing engine and a passive processing engine, the method comprising:

processing, by the active processing engine, a packet associated with a communication session;

storing session information for the communication session at the active processing engine in a connection record;

in response to determining, by the active processing engine, that a time period between packets received for the communication session exceeds a threshold, determining that the communication session is an idle connection;

sending, by the active processing engine to the passive processing engine, a message that contains connection tuple information and connection state for the idle connection, wherein the connection tuple information is usable by the passive processing engine to transfer the connection record to a connection table stored at the passive processing engine; and maintaining the connection record for the idle connection in the connection table stored at the passive processing engine, thereby allowing the passive processing engine to maintain connection state information for the idle connection and avoid storing connection state information for the idle connection at the active processing engine, wherein a combined connection table for the SDN is a sum of connection tables stored by the active and passive processing engines which collectively allows for an increased number of total connection records that can be serviced by the networking device.

Clause 2: The method of clause 1, method of claim 1, wherein the connection record comprises a TCP tuple key.

Clause 3: The method of any of clauses 1-2, wherein the connection record comprises a bi-directional UDP flow tuple key.

Clause 4: The method of any of clauses 1-3, wherein the connection record comprises a currently derived TCP state.

Clause 5: The method of any of clauses 1-4, wherein the connection record comprises a currently derived UDP state.

Clause 6: The method of any of clauses 1-5, wherein the connection record comprises forwarding and transformation information for fast path processing.

Clause 7: The method of clauses 1-6, wherein the threshold is less than a connection aging time-out.

Clause 8: A system for managing states at a networking device configured to track connections or bidirectional flows of a communication session in a software defined network (SDN), the networking device having an active processing engine and a passive processing engine, the system comprising:
a processing unit; and
a computer readable medium having encoded thereon computer readable instructions that when executed by the processing unit cause the system to perform operations comprising:
processing, by the active processing engine, a packet associated with a communication session;
storing session information for the communication session at the active processing engine;
in response to determining, by the active processing engine, that a time period between packets received for the communication session exceeds a threshold, determining that the communication session is an idle connection;
sending, by the active processing engine to the passive processing engine, a message that contains connection tuple information and connection state for the idle connection, wherein the connection tuple information is usable by the passive processing engine to transfer the session information to a connection table stored at the passive processing engine; and
maintaining the session information for the idle connection in the connection table stored at the passive processing engine, thereby allowing the passive processing engine to maintain connection state information for the idle connection and avoid storing connection state information for the idle connection at the active processing engine, wherein a combined connection table for the SDN is a sum of connection tables stored by the active and passive processing engines which collectively allows for an increased number of total connection records that can be serviced by the networking device.

Clause 9: The system of clause 8, wherein the session information comprises a TCP tuple key.

Clause 10: The system of any of clauses 8 and 9, wherein the session information comprises a bi-directional UDP flow tuple key.

Clause 11: The system of any of clauses 8-10, wherein the session information comprises a currently derived TCP state.

Clause 12: The system of any clauses 8-11, wherein the session information comprises a currently derived UDP state.

Clause 13: The system of any clauses 8-12, wherein the session information comprises forwarding and transformation information for fast path processing.

Clause 14: The system of any clauses 8-13, wherein the threshold is less than a connection aging time-out.

Clause 15: A computer readable storage medium having encoded thereon computer readable instructions that when executed by a system cause the system to:
process, at a networking device configured to track connections or bidirectional flows of a communication session in a software defined network (SDN), a packet associated with the communication session, the networking device having an active processing engine and a passive processing engine;
store session information for the communication session at the active processing engine;
in response to determining that a time period between packets received for the communication session exceeds a threshold, determine that the communication session is an idle connection;
send by the active processing engine to the passive processing engine, a message that contains connection tuple information and connection state for the idle connection, wherein the connection tuple information is usable by the passive processing engine to transfer the session information to a connection table stored at the passive processing engine; and
maintain the session information for the idle connection in the connection table stored at the passive processing engine, thereby allowing the passive processing engine to maintain connection state information for the idle connection and avoid storing connection state information for the idle connection at the active processing engine, wherein a combined connection table for the SDN is a sum of connection tables stored by the active and passive processing engines which collectively allows for an increased number of total connection records that can be serviced by the networking device.

Clause 16: The computer-readable storage medium of clause 15, wherein the session information comprises a TCP tuple key.

Clause 17: The computer-readable storage medium of any of clauses 15 and 16, wherein the session information comprises a bi-directional UDP flow tuple key.

Clause 18: The computer-readable storage medium of any of clauses 15-17, wherein the session information comprises a currently derived TCP state.

Clause 19: The computer-readable storage medium of any of clauses 15-18, wherein the session information comprises a currently derived UDP state.

Clause 20: The computer-readable storage medium of any of clauses 15-19, wherein the session information comprises forwarding and transformation information for fast path processing.

What is claimed is:

1. A method for managing states at a networking device configured to track connections or bidirectional flows of a communication session in a software defined network (SDN), the networking device having an active processing engine and a passive processing engine, the method comprising:
processing, by the active processing engine, a packet associated with a communication session;
storing session information for the communication session at the active processing engine in a connection record;
in response to determining, by the active processing engine, that a time period between packets received for the communication session exceeds a threshold, determining that the communication session is an idle connection;
sending, by the active processing engine to the passive processing engine, a message that contains connection tuple information and connection state for the idle connection, wherein the connection tuple information is usable by the passive processing engine to transfer the connection record to a connection table stored at the passive processing engine; and
maintaining the connection record for the idle connection in the connection table stored at the passive processing engine, wherein the active processing engine is implemented on a first processor and memory subsystem and the passive processing engine is implemented on a second processor and memory subsystem, the first and second processor and memory subsystems being different, thereby allowing the passive processing engine to maintain connection state information for the idle connection and avoid storing connection state information for the idle connection at the active processing engine, wherein a combined connection table for the SDN is a sum of connection tables stored by the active and passive processing engines which collectively allows for an increased number of total connection records that can be serviced by the networking device.

2. The method of claim 1, wherein the connection record comprises a TCP tuple key.

3. The method of claim 1, wherein the connection record comprises a bi-directional UDP flow tuple key.

4. The method of claim 1, wherein the connection record comprises a currently derived TCP state.

5. The method of claim 1, wherein the connection record comprises a currently derived UDP state.

6. The method of claim 1, wherein the connection record comprises forwarding and transformation information for fast path processing.

7. The method of claim 1, wherein the threshold is less than a connection aging time-out.

8. A system for managing states at a networking device configured to track connections or bidirectional flows of a communication session in a software defined network (SDN), the networking device having an active processing engine and a passive processing engine, the system comprising:
a processing unit; and
a computer readable medium having encoded thereon computer readable instructions that when executed by the processing unit cause the system to perform operations comprising:
processing, by the active processing engine, a packet associated with a communication session;
storing session information for the communication session at the active processing engine;
in response to determining, by the active processing engine, that a time period between packets received for the communication session exceeds a threshold, determining that the communication session is an idle connection;
sending, by the active processing engine to the passive processing engine, a message that contains connection tuple information and connection state for the idle connection, wherein the connection tuple information is usable by the passive processing engine to transfer the session information to a connection table stored at the passive processing engine; and
maintaining the session information for the idle connection in the connection table stored at the passive processing engine, wherein the active processing engine is implemented on a first processor and memory subsystem and the passive processing engine is implemented on a second processor and memory subsystem, the first and second processor and memory subsystems being different, thereby allowing the passive processing engine to maintain connection state information for the idle connection and avoid storing connection state information for the idle connection at the active processing engine, wherein a combined connection table for the SDN is a sum of connection tables stored by the active and passive processing engines which collectively allows for an increased number of total connection records that can be serviced by the networking device.

9. The system of claim 8, wherein the session information comprises a TCP tuple key.

10. The system of claim 8, wherein the session information comprises a bi-directional UDP flow tuple key.

11. The system of claim 8, wherein the session information comprises a currently derived TCP state.

12. The system of claim 8, wherein the session information comprises a currently derived UDP state.

13. The system of claim 8, wherein the session information comprises forwarding and transformation information for fast path processing.

14. The system of claim 11, wherein the threshold is less than a connection aging time-out.

15. A non-transitory computer readable storage medium having encoded thereon computer readable instructions that when executed by a system cause the system to:
process, at a networking device configured to track connections or bidirectional flows of a communication session in a software defined network (SDN), a packet associated with the communication session, the networking device having an active processing engine and a passive processing engine;
store session information for the communication session at the active processing engine;
in response to determining that a time period between packets received for the communication session exceeds a threshold, determine that the communication session is an idle connection;
send by the active processing engine to the passive processing engine, a message that contains connection tuple information and connection state for the idle connection, wherein the connection tuple information is usable by the passive processing engine to transfer the session information to a connection table stored at the passive processing engine; and
maintain the session information for the idle connection in the connection table stored at the passive processing engine, wherein the active processing engine is implemented on a first processor and memory subsystem and the passive processing engine is implemented on a second processor and memory subsystem, the first and second processor and memory subsystems being different, thereby allowing the passive processing engine to maintain connection state information for the idle connection and avoid storing connection state information for the idle connection at the active processing engine, wherein a combined connection table for the SDN is a sum of connection tables stored by the active and passive processing engines which collectively allows for an increased number of total connection records that can be serviced by the networking device.

16. The non-transitory computer readable storage medium of claim 15, wherein the session information comprises a TCP tuple key.

17. The non-transitory computer readable storage medium of claim 15, wherein the session information comprises a bi-directional UDP flow tuple key.

18. The non-transitory computer readable storage medium of claim 15, wherein the session information comprises a currently derived TCP state.

19. The non-transitory computer readable storage medium of claim 15, wherein the session information comprises a currently derived UDP state.

20. The non-transitory computer readable storage medium of claim 15, wherein the session information comprises forwarding and transformation information for fast path processing.

* * * * *